United States Patent [19]

Dietz

[11] Patent Number: 4,526,266
[45] Date of Patent: Jul. 2, 1985

[54] DUAL-T TRANSFER CONVEYOR

[75] Inventor: Keith A. Dietz, Dallas, Tex.

[73] Assignee: Stewart Engineering & Equipment Co., Inc., Plano, Tex.

[21] Appl. No.: 407,046

[22] Filed: Aug. 11, 1982

[51] Int. Cl.³ .................. B65G 15/58; B65G 37/00; B65G 47/26

[52] U.S. Cl. .................. 198/357; 198/444; 198/448; 198/457; 198/690

[58] Field of Search .............. 198/357, 370, 444, 448, 198/451, 457, 469, 470, 690; 271/184, 225, DIG. 3

[56] References Cited

U.S. PATENT DOCUMENTS

| | | | |
|---|---|---|---|
| 1,425,556 | 8/1922 | Tingwall et al. | 198/363 |
| 2,274,677 | 10/1939 | Eberhart | 198/690 X |
| 2,276,471 | 3/1942 | Eberhart | 62/63 |
| 2,276,472 | 3/1942 | Eberhart | 198/690 X |
| 2,726,752 | 12/1955 | Maher | 198/690 X |
| 2,766,043 | 10/1956 | Bucciconi | 198/357 X |
| 3,075,630 | 3/1959 | Fisk | 198/572 |
| 3,140,771 | 7/1964 | Harrison et al. | 198/470 X |
| 3,223,225 | 12/1965 | Clark et al. | 198/357 |
| 3,545,595 | 12/1970 | Reist | 198/572 |
| 3,581,873 | 6/1971 | Spedig | 198/690 |
| 3,613,865 | 10/1971 | Hedrick et al. | 198/448 X |
| 3,615,001 | 11/1965 | Temple | 198/444 |
| 3,642,118 | 2/1972 | Kernyiak | 198/690 |
| 3,822,009 | 7/1974 | Richards | 198/444 |
| 4,034,846 | 7/1977 | Burgis et al. | 198/422 |
| 4,215,774 | 8/1980 | Manservisi | 198/444 |

Primary Examiner—Joseph E. Valenza
Assistant Examiner—David A. Bucci
Attorney, Agent, or Firm—Gardere & Wynne

[57] ABSTRACT

A dual-T transfer conveyor (10) includes a cross conveyor (12) wherein a plurality of interconnected flights (42) formed from low friction plastic material define a conveying plane (114). Input conveyors (14,16) each have a belt (80) formed from belting material and defining conveying planes (116) situated above the conveying plane (114) of the cross conveyor (12). Permanent magnets (86) are used to return the trailing end of each article carried by each input conveyor (14,16) in engagement with the belt (80) thereof as the leading end of the article is extended over the conveying plane of the cross conveyor (12).

7 Claims, 5 Drawing Figures

DUAL-T TRANSFER CONVEYOR

TECHNICAL FIELD

This invention relates to transfer conveyors, and more particularly to a system for transporting articles such as bakery pans received from one or more input conveyors onto a continuously operating cross conveyor.

BACKGROUND AND SUMMARY OF THE INVENTION

In the operation of a modern bakery, conveyor systems are utilized to transport baking pans from dough receiving locations, through proofing locations, through ovens and finally to product discharge locations. Quite often pans being carried in one orientation through a processing station in one part of the bakery operation will need to be rotated 90° for movement through the next processing station. At the same time multiple pan flows may be combined to a single flow on a receiving conveyor. It will be understood that the process of reorienting and combining the pans in the conveyor system must be carried out in a smooth and orderly manner and with appropriate spacing between pans in accordance with the operating characteristics of the bakery.

Prior to the present invention, various systems for inserting baking pans into conveyor systems have been used. In general, prior pan insertion systems have been characterized by the use of complex mechanical and/or photoelectric systems for establishing pan location, coupled with gating and/or braking systems for establishing gaps to facilitate pan insertion. Such complexities have made the prior systems expensive to install and have necessitated frequent maintenance in order to ensure their continued operation.

The present invention overcomes the foregoing and other difficulties associated with the prior art by providing a dual-T transfer conveyor which is uncomplicated in design and manufacture and therefore relatively inexpensive to install and relatively trouble free in operation when compared with prior systems. In accordance with the broader aspects of the invention, one or more input conveyors are utilized to cyclically insert articles onto a continuously operating cross conveyor. Permanent magnets are utilized to enhance the driving engagement between each input conveyor and the articles to be inserted, and each input conveyor is operated through a clutch/brake to ensure precise control over article movement. The conveying plane of the input conveyors is situated above the conveying plane of the cross conveyor, and the conveying surface of the cross conveyor is formed from a low friction plastic to assure insertion of the articles without skewing. When two input conveyors are utilized, the operating cycle of the upstream input conveyor is regulated to provide gaps between articles inserted therefrom. This in turn allows the downstream conveyor to insert articles between articles previously inserted from the upstream input conveyor.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
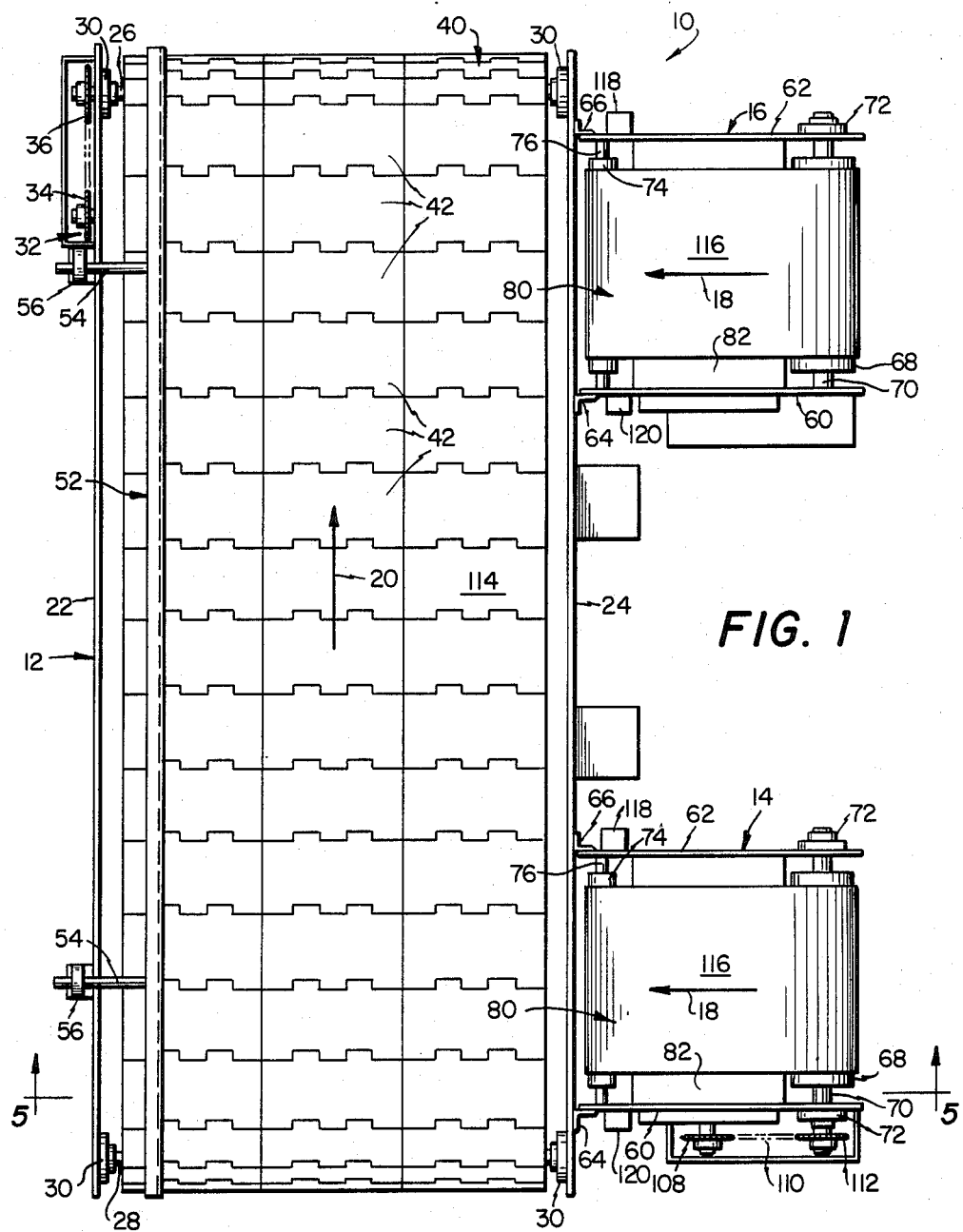
FIG. 1 is a top view of a dual-T transfer conveyor incorporating the invention.

Referring now to the Drawings, and particularly to FIG. 1 thereof, there is shown a dual-T transfer conveyor 10 incorporating the invention. The conveyor 10 comprises a cross conveyor 12 and a pair of input conveyors, including an upstream input conveyor 14 and a downstream input conveyor 16. The input conveyors 14 and 16 function to insert articles onto the cross conveyor 12 in the direction indicated by the arrows 18, and the cross conveyor 12 functions to transport inserted articles in a direction extending transversely to the direction of the arrows 18, as indicated by the arrow 20.

The cross conveyor 12 includes a frame comprising a pair of side plates 22 and 24. A pair of axles 26 and 28 are rotatably supported at the opposite ends of the frame by bearings 30 mounted on the side plates 22 and 24. The cross conveyor 12 includes a drive motor (not shown) which drives a speed reducer (also not shown) which in turn drives a sprocket 32. The sprocket 32 drives a chain 34 which in turn drives a sprocket 36. The sprocket 36 is connected to the axle 26 whereby the drive motor operates through the speed reducer, the sprocket 32, the chain 34 and the sprocket 36 to drive the cross conveyor 12. The axle 28 is non-driven.

The cross conveyor 12 further includes a conveyor belt 40. The belt 40 is comprised of a plurality of interconnected flights 42. The flights 42 are of the type manufactured by Rexnord of Milwaukee, Wis. and identified by that company as Rex 821 Series Chain.

Figure 5:
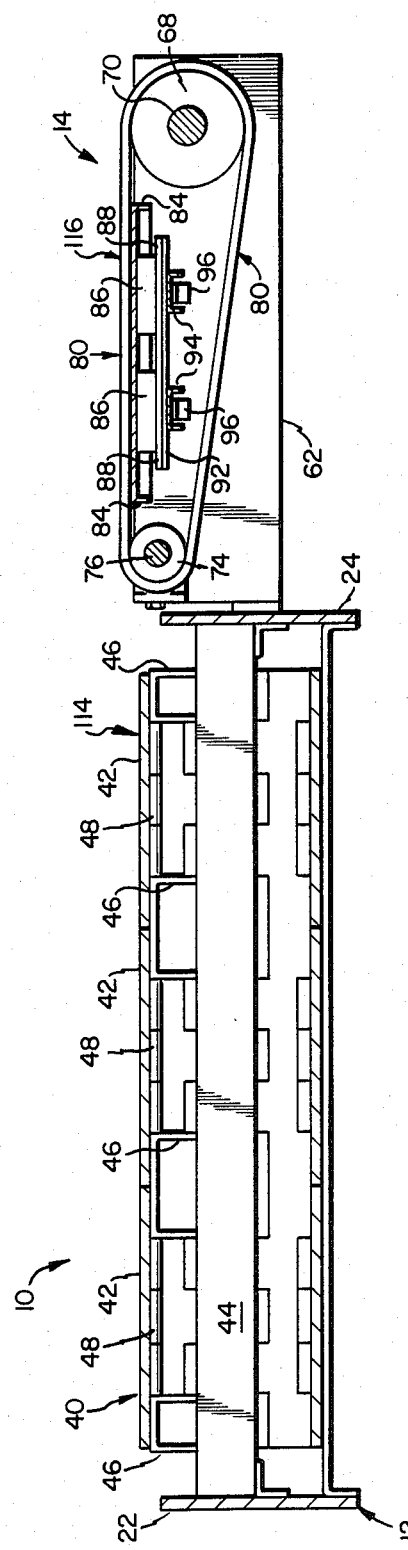
FIG. 5 is a sectional view taken along the lines 5—5 in FIG. 1.

Referring to FIG. 5, the frame of the cross conveyor 12 includes a plurality of cross braces 44 extending between the side plates 22 and 24. The cross braces 44 support a plurality of guides 46. The flights 42 of the belt 40 have depending lugs 48 which engage the guides 46 to maintain alignment of the belt 40. The lugs 48 also engage sprockets (not shown) mounted on the axles 26 and 28. The sprockets define the course of the belt 40, and the belt 40 is driven around the course by the drive motor operating through the speed reducer, the sprocket 32, the chain 34, the sprocket 36 and the axle 26. The sprockets of the cross conveyor 12 are preferably of the type manufactured and sold by Rexnord of Milwaukee, Wis. and identified by the company as Series 821 sprockets.

The flights 42 comprising the belt 40 are formed from a low friction plastic material. For example, the flights of 821 series chain sold by Rexnord are formed from acetal. Those skilled in the art will appreciate the fact that the belt 40 of the cross conveyor 12 can take the form of various commercially available conveyor belt types, and that the low friction conveying surface of the belt 40 can comprise various commercially available plastic materials, in accordance with requirements with particular applications of the invention.

A guide 52 extends along the edge of the cross conveyor 12 remote from the input conveyors 14 and 16. The guide 52 may comprise a length of angle iron extending the entire length of the cross conveyor 12. Rods 54 are secured to the guide 52 and extend through retainers 56 which are secured to the side plate 22. The retainers 56 include fasteners which may be used to secure the rods 54 and therefore the guide 52 in any desired location with respect to the center line of the belt 40.

Figure 2:
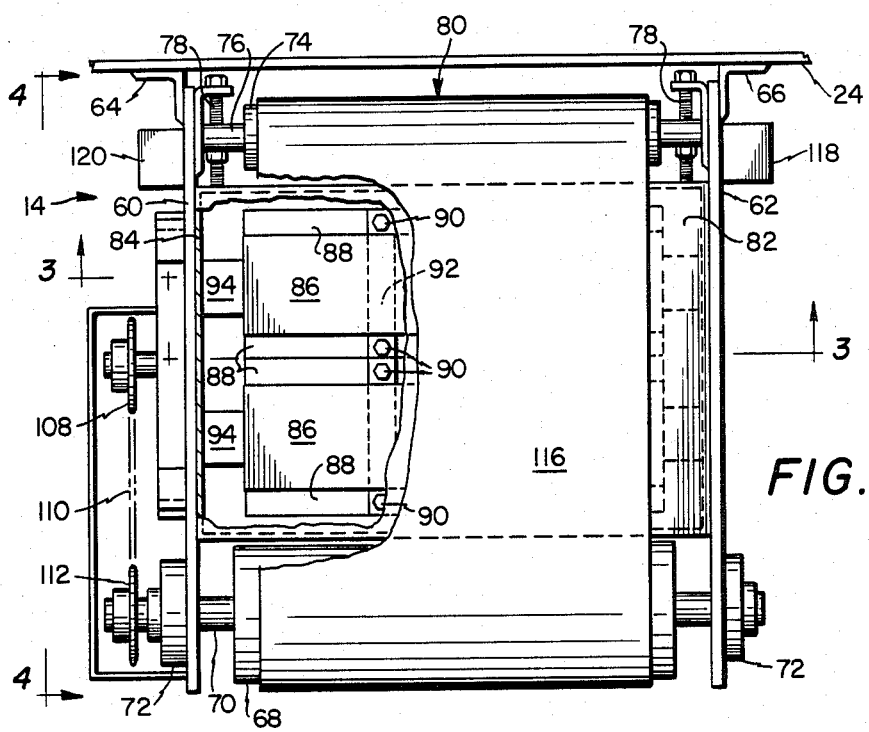
FIG. 2 is an enlarged top view of one of the input conveyors utilized in the dual-T transfer conveyor of FIG. 1 in which certain parts have been broken away more clearly to illustrate certain features of the invention.
Figure 3:
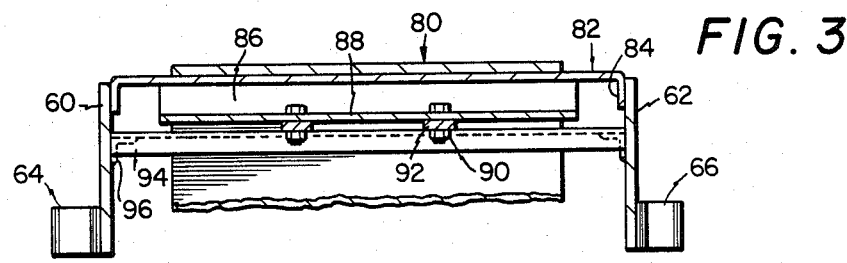
FIG. 3 is a sectional view taken along the lines 3—3 in FIG. 2 in the direction of the arrows.
Figure 4:
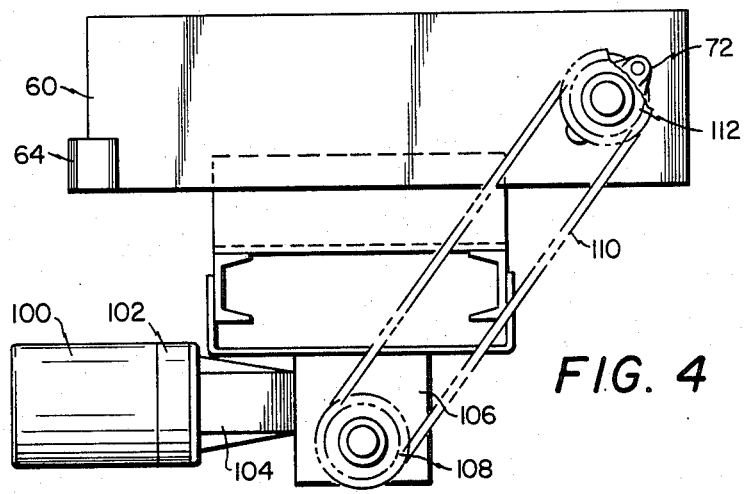
FIG. 4 is an end view of the input conveyor of FIG. 2.

The structural details of the input conveyors 14 and 16 are illustrated in FIGS. 2, 3 and 4. Although the upstream input conveyor 14 is specifically designated therein, it will be understood that the construction of the downstream input conveyor 16 is identical to that of the conveyor 14. Therefore, the following description of the conveyor 14 applies equally to the conveyor 16.

The conveyor 14 includes a frame comprising a pair of side plates 60 and 62 which are secured to the side plate 24 of the cross conveyor 12 by means of brackets 64 and 66, respectively. A pulley 68 is mounted on a shaft 70 which is rotatably supported by bearings 72 mounted on the side plates 60 and 62. A pulley 74 is rotatably supported on a shaft 76. The spacing and the angular relationship between the shaft 70 and the shaft 76 is adjustable by means of bolts 78.

A conveyor belt 80 is constrained around the pulleys 68 and 74 and comprises conventional belting material. An article supporting pan 82 is positioned directly beneath the conveyor belt 80 and is defined by a peripheral rim 84. A pair of permanent magnets 86 are positioned directly beneath the pan 82 and are provided with laterally extending flanges 88. Fasteners 90 are utilized to secure the flanges 88 to underlying brackets 92 which are in turn supported by channel members 94. As is best shown in FIG. 3, the channel members 94 are mounted on brackets 96 which are secured to the side plates 60 and 62.

It will thus be understood that any ferrous article positioned on the conveying surface of the conveyor belt 80 will be attracted by the permanent magnets 86. By this means the driving engagement between the belt 80 and the article carried thereby is substantially enhanced, and any possibility of slippage between the belt 80 and the article is substantially eliminated.

Referring to FIG. 4, the input conveyor 14 is driven by a motor 100 having an output which is drivingly connected to a clutch/brake 102. The motor 100 and the clutch/brake 102 are connected by means of a bracket 104 to a speed reducer 106. The output of the clutch brake 102 is drivingly connected to the input of the speed reducer 106 which in turn drives a sprocket 108. The sprocket 108 drives a chain 110 which in turn drives a sprocket 112. The sprocket 112 is connected to the shaft 70, whereby the motor 100 operates through the clutch/brake 102, the speed reducer 106, the sprocket 108, the chain 110, the sprocket 112, the shaft 70 and the pulley 68 to drive the belt 80. The use of the clutch/brake 102 in the drive train of the input conveyor 14 comprises an important feature of the invention in that it affords very precise control over the movement of articles carried by the belt 80.

Referring to FIG. 5, each of the input conveyors 14 and 16 has a conveying surface 116 which is positioned substantially above the conveying surface 114 of the cross conveyor 12. In actual practice, the positioning of the conveying surfaces 116 of the input conveyors 14 and 16 approximately ½ inch above the conveying surface 114 of the cross conveyor 12 has been found to be advantageous. The purpose of the positioning of the conveying surfaces 116 of the input conveyors 14 and 16 above the conveying surface 114 of the cross conveyor 12 is to allow the leading edge of each article inserted by an input conveyor onto the cross conveyor to be positioned substantially over the conveying surface 114 of the cross conveyor 12 prior to the release of the article from the input conveyor. This fact, together with the fact that the conveying surface 114 of the cross conveyor 12 is fabricated from a low friction plastic material, substantially eliminates any possibility of skewing of the inserted article relative to the direction of the arrow 20 as the article is inserted from one of the input conveyors 14 and 16 onto the cross conveyor 12.

Referring again to FIG. 1, each of the input conveyors 14 and 16 is provided with a light source 118 and a photo sensor 120. Each light source 118 directs a light beam across the path of travel of articles carried by the belt 80 of its associated input conveyor, and each photo sensor 120 functions to detect the light beam generated by its associated light source 118. Thus, the light source 118 and the photo sensor 120 of each input conveyor 14 and 16 function in the usual manner to detect the presence of an article at a predetermined point along the path of the conveyor belt 80.

OPERATION

In the use of the dual-T transfer conveyor 10 articles to be inserted onto the cross conveyor 12 are received by the input conveyors 14 and 16 from feeder conveyors (not shown). Initially, the drive motors 100 are connected through the clutch/brakes 102 to drive the belts 80 so that received articles are advanced toward the cross conveyor 12. As soon as the photo sensor 120 of a particular input conveyor fails to detect the light beam generated by its associated light source 118 the associated clutch/brake 102 is immediately actuated to stop operation of the conveyor belt 80.

Assume now that articles have been received by both of the input conveyors 14 and 16 and that the articles have been advanced to the point that neither of the photo sensors 120 receives light from its associated light source 118. Both of the clutch/brakes 102 are therefore actuated to stop operation of the conveyor belts 80, and the dual-T transfer conveyor 10 is ready to begin a cycle of operation.

The upstream input conveyor 14 is initially operated by actuation of the clutch/brake 102 to drivingly interconnect the motor 100 and the belt 80. The article carried by the belt 80 of the upstream input conveyor 14 is therefore advanced toward the cross conveyor 12. Since the conveying surface 116 of the input conveyor 14 is positioned substantially above the conveying surface 114 of the cross conveyor 12, and since the trailing end of the article being inserted by the input conveyor 14 remains in the field of the magnets 86 as the article is advanced, the lead end of the article is projected a substantial distance over the conveying surface 114 of the cross conveyor 12 prior to the release of the article from the input conveyor 14. Actually, the construction of the input conveyor 14 is such that articles are substantially propelled across the conveying surface 114 of the cross conveyor 12 until they come into contact with the guide 52. This fact, together with the fact that the conveying surface 114 of the cross conveyor 12 is formed from a low friction plastic material substantially eliminates any possibility of skewing of articles as they are inserted from the input conveyors 14 and 16 onto the cross conveyor 12.

The insertion of an article from the input conveyor 14 onto the cross conveyor 12 once again permits light to pass from the light source 118 to the photo sensor 120 of the input conveyor 14, whereby the clutch/brake 102 continues to drivingly interconnect the motor 100 and the conveyor belt 80. Therefore, another article is advanced by the belt 80 until light from the source 118 is no longer received by the photo sensor 120. At this point the clutch/brake 102 is again actuated to immediately terminate the motion of the conveyor belt 80 and the article carried thereby.

Operation of the upstream input conveyor 14 is not immediately reinitiated. Rather, a predetermined time interval is allowed to pass prior to actuation of the clutch/brake 102 of the conveyor 14 to insert the second article onto the cross conveyor 12. The purpose of a predetermined time delay between each operating cycle of the input conveyor 14 is to allow the cross conveyor 12 to advance each article inserted by the conveyor 14 a predetermined distance prior to insertion of the next succeeding article by the conveyor 14. This method of operation creates a predetermined gap between adjacent articles inserted onto the cross conveyor 12 from the upstream conveyor 14 the purpose of which is to allow articles to be inserted onto the cross conveyor 12 from the downstream input conveyor 16 between articles previously inserted onto the cross conveyor 12 from the upstream input conveyor 14. Thus, articles inserted from the upstream input conveyor 14 occupy alternate spaces in a procession of articles carried by the cross conveyor 12 in the direction of the arrow 20, and the open spaces or gaps which are initially provided between articles inserted onto the cross conveyor 12 from the input conveyor 14 are filled by articles inserted onto the cross conveyor 12 from the downstream input conveyor 16.

The downstream input conveyor 16 operates in a manner identical to the operation of the upstream input conveyor 14. That is, articles are initially advanced by the conveyor 16 until the light path from the source 118 to the photo sensor 120 is broken. At that point operation of the conveyor 16 is stopped until a predetermined point in the operating cycle of the dual-T transfer conveyor 10, at which time the input conveyor 16 is operated to insert the article onto the cross conveyor 12. The conveyor 16 is operated at a precise point in the operating cycle of the dual-T transfer conveyor 10 such that articles inserted onto the cross conveyor 12 from the input conveyor 16 are received in the gaps which have purposely been maintained between articles previously inserted onto the cross conveyor 12 from the upstream conveyor 14.

Although particular embodiments of the invention have been described in the foregoing Detailed Description and illustrated in the accompanying Drawings, it will be understood that the invention is not limited to the embodiments disclosed, but is capable of numerous rearrangements, modifications, and substitutions of parts and elements without departing from the spirit of the invention.

I claim:

1. A conveyor system comprising:
  a cross conveyor for transporting articles in a first predetermined direction and comprising a continuous conveying surface of predetermined length formed from a relatively low friction material which defines a conveying plane and article supporting surface positioned at a first predetermined elevation;
  at least one input conveyor for transporting articles in a second predetermined direction which is substantially perpendicular to the first predetermined direction and positioned to insert articles onto the conveying surface of the cross conveyor for transportation thereby;
  the input conveyor comprising a conveying surface formed from a relatively high friction material defining a conveying plane positioned at a second predetermined elevation which is higher than the first predetermined elevation of the conveying plane of the cross conveyor;
  the input conveyor having a discharge end positioned to discharge articles conveyed thereby directly onto the cross conveyor;
  the cross conveyor being driven continuously as the input conveyor inserts articles onto the conveying surface of the cross conveyor, the relatively low friction material of the cross conveyor facilitating the transfer of articles from the input conveyors by reducing frictional forces that cause skewing of the articles during their discharge onto the cross conveyor; and
  magnet means for magnetically attracting and maintaining the trailing end of each article conveyed by the input conveyor in contact with the conveying surface thereof as the leading end of the article is extended over the conveying surface of the cross conveyor.

2. The conveying system according to claim 1 wherein the input conveyor includes a drive system comprising a drive motor, a clutch/brake drivingly connected to the output of the drive motor, transmission means for drivingly interconnecting the output of the clutch/brake and the conveying surface of the input conveyor, and means for selectively actuating the clutch/brake to either couple the output of the drive motor to the conveying surface of the input conveyor so that the conveying surface is driven around a predetermined course or to disconnect the output of the drive motor from the conveying surface so that the movement of the conveying surface and articles carried thereby is arrested.

3. A conveying system comprising:
  a cross conveyor for transporting articles in a first predetermined direction and having a continuous conveying surface of predetermined length formed from a relatively low friction material which defines a conveying plane and article supporting surface positioned at a first predetermined elevation;
  at least two input conveyors positioned at spaced apart points along the cross conveyor for transporting articles in a second predetermined direction which is substantially perpendicular to the first predetermined direction and each for inserting articles onto the conveying surface of the cross conveyor;
  each of the input conveyors comprising a conveying surface formed from a relatively high friction material which defines a conveying plane positioned at a second predetermined elevation which is above the first predetermined elevation of the conveying plane of the cross conveyor;

each of the input conveyors having a discharge end positioned to discharge articles conveyed thereby directly onto the cross conveyor;

the cross conveyor being driven continuously as the input conveyor inserts articles onto the conveying surface of the cross conveyor, the relatively low friction material of the cross conveyor facilitating the transfer of articles from the input conveyors by reducing frictional forces that cause skewing of the articles during their discharge onto the cross conveyor; and magnet means for magnetically attracting and maintaining the trailing end of each article conveyed by each input conveyor in engagement with the conveying surface thereof as the leading end of the article is extended over the conveying surface of the cross conveyor by operation of the input conveyor; and means for operating the first input conveyor to insert articles onto the conveying surface of the cross conveyor in a predetermined spaced apart pattern and for operating the other input conveyor to insert articles onto the conveying surface of the cross conveyor in the spaces provided between the articles previously inserted thereon.

4. The conveying system according to claim 3 wherein each of the input conveyors further includes drive means for moving the conveying surface of the input conveyor around a predetermined course, and wherein the drive means includes clutch/brake means for selective actuation to either effect movement of the conveying surface around the predetermined course or to arrest movement of the conveying surface.

5. The conveying system according to claim 3 wherein the conveying surface of the cross conveyor is formed from a low friction plastic material.

6. A conveying system comprising:

a cross conveyor comprising a plurality of interconnected flights each formed from a relatively low friction plastic material which define a continuous conveying plane and article supporting surface of predetermined length positioned at a first predetermined elevation and means for moving the interconnected flights around a first predetermined course to effect movement of articles carried by the flights in the conveying plane in a first predetermined direction;

at least two input conveyors positioned at spaced apart points along the cross conveyor and each positioned to insert articles onto the conveying plane of the cross conveyor;

each of the input conveyors comprising a continuous length of relatively high friction belting material defining a conveying plane positioned at a second predetermined elevation above the first predetermined elevation of the conveying plane of the cross conveyor and means for moving the length of belting material around a second predetermined course to effect movement of articles in a second predetermined direction extending substantially perpendicular to the first predetermined direction;

each of the input conveyors further comprising a discharge end positioned to discharge articles conveyed thereby directly onto the cross conveyor;

the cross conveyor being driven continuously as the input conveyor inserts articles onto the conveying surface of the cross conveyor, the relatively low friction material of the cross conveyor facilitating the transfer of articles from the input conveyors by reducing frictional forces that cause skewing of the articles during their discharge onto the cross conveyor; and each of the input conveyors further comprising magnet means for magnetically attracting and retaining the trailing end of each article conveyed by the input conveyor in engagement with the length of belting material of the input conveyor as the leading end of the article is extended over the conveying surface of the cross conveyor by operation of the input conveyor.

7. The conveying system according to claim 6 wherein the drive means of each of the input conveyors further comprises clutch/brake means for selective actuation to either effect movement of the length of belting material around the second predetermined course or to arrest movement of the length of belting material.

* * * * *